United States Patent
Shin et al.

(10) Patent No.: US 9,141,210 B2
(45) Date of Patent: Sep. 22, 2015

(54) PROXIMITY/MOTION AND TOUCH SENSOR AND DISPLAY DEVICE HAVING THE SAME

(71) Applicant: LG Display Co., Ltd., Seoul (KR)

(72) Inventors: Seungrok Shin, Goyang-si (KR); Taeyun Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 107 days.

(21) Appl. No.: 13/714,055

(22) Filed: Dec. 13, 2012

(65) Prior Publication Data

US 2013/0293489 A1    Nov. 7, 2013

(30) Foreign Application Priority Data

May 4, 2012   (KR) .......................... 10-2012-0047711

(51) Int. Cl.
*G06F 3/041* (2006.01)
*G06F 3/044* (2006.01)

(52) U.S. Cl.
CPC ............... *G06F 3/041* (2013.01); *G06F 3/044* (2013.01); *G06F 2203/04101* (2013.01); *G06F 2203/04111* (2013.01)

(58) Field of Classification Search
CPC ............... G06F 3/044; G06F 3/0416; G06F 2203/04101; G06F 2203/04108
USPC .................................................. 345/173, 174
See application file for complete search history.

(56) References Cited

U.S. PATENT DOCUMENTS

| 5,565,658 | A   | * | 10/1996 | Gerpheide et al. | ......... 178/18.02 |
| 2011/0227858 | A1 | * | 9/2011  | An et al.        | ........................ 345/174 |
| 2012/0127124 | A1 | * | 5/2012  | Zanone et al.    | ................ 345/174 |
| 2012/0268422 | A1 | * | 10/2012 | Hirakawa et al.  | ............. 345/174 |

FOREIGN PATENT DOCUMENTS

| KR | 10-2009-0107640 A | 10/2009 |
| KR | 10-2011-0001907 A | 1/2011 |
| KR | 10-2011-0044614 A | 4/2011 |

OTHER PUBLICATIONS

Korean Intellectual Property Office, Office Action, Korean Patent Application No. 10-2012-0047711, Mar. 31, 2014, five pages [with concise explanation of relevancy in English].

* cited by examiner

*Primary Examiner* — Koosha Sharifi-Tafreshi
(74) *Attorney, Agent, or Firm* — Fenwick & West LLP

(57) ABSTRACT

This disclosure relates to a proximity/motion and touch sensor. The proximity/motion and touch sensor includes a proximity/motion driving electrode, a plurality of first proximity/motion sensing electrode, a plurality of second proximity/motion sensing electrode serials, a plurality of first touch electrode serials, and a plurality of second touch electrode serials.

21 Claims, 14 Drawing Sheets

PROXIMITY/MOTION AND TOUCH SENSOR AND DISPLAY DEVICE HAVING THE SAME

CROSS-REFERENCE TO RELATED APPLICATIONS

This application claims the benefit of Korean Patent Application No. 10-2012-0047711 filed on May 4, 2012, which is hereby incorporated by reference herein in its entirety.

BACKGROUND

1. Field of the Invention

This document relates to a proximity/motion and touch sensor, and a display device having the same.

2. Discussion of the Related Art

In recent years, various display devices such as a liquid crystal display, an electroluminescent display, and a plasma display panel being driven at a low power consumption, having a quick response speed and an accurate color reproduction rate, have been in the spotlight. The display devices are used for various electronic products such as televisions, monitors for computers, notebook computers, mobile telephones, display units for refrigerators, personal digital assistants, automated teller machines, and the like. In general, the display devices are interfaced with users using various input devices such as a keyboard, a mouse, and a digitizer.

However, when using some input devices such as a keyboard, a mouse, and digitizer, user's dissatisfaction increases because the user is required to know how to use the input devices and the input devices occupy space. Therefore, a convenient and simple input device that can reduce erroneous operation is needed.

In other instances, there is a need for a touch sensor in which a user can input information by directly contacting a screen with a finger or a pen. Because the touch sensor has a simple configuration, which minimizes erroneous operations, the user can perform an input action without using an input device, and can quickly and easily manipulate a device through contents displayed on a screen. Accordingly, the touch sensor has been applied to various display devices.

A touch sensor integrated with a display device can give users a user interface capable of selecting required functions though touch menus or icons displayed on a screen of the display device. However, the related art touch sensor cannot give users various user interfaces capable of selecting required functions by recognizing user's motion or gesture. For example, with the development of wireless internet technologies, it is possible to easily access internet web sites, voice data services, video data services, electronic book services, and so on using portable information telecommunication devices such as mobile phones, PDAs, tablet personal computers, netbook computers, and notebook computers similar to desktop computers. However, for example, if a user wants to flip through pages of internet web sites or turn up or turn down volume of the voice and video data services, it is inconvenient because the user must be in position to activate displayed menus with the touch sensor.

SUMMARY

An object of this disclosure is to provide a proximity/motion and touch sensor that senses proximity and/or motion as well as touch of fingers or pens.

In one embodiment, a proximity/motion and touch sensor comprises a plurality of first proximity/motion sensing electrode serials insulated from the proximity/motion driving electrode and arranged in a first direction to be separated from each other, the first direction crossing over the second direction; a plurality of second proximity/motion sensing electrode serials insulated from the proximity/motion driving electrode and arranged in a second direction to be separated from each other; a plurality of first touch electrode serials insulated from the first proximity/motion sensing electrode serials and arranged in the first direction to be separated from each other; and a plurality of second touch electrode serials insulated from the first proximity/motion sensing electrode serials and the first touch electrode serials and arranged in the second direction to be separated from each other.

In the embodiment, the plurality of first proximity/motion sensing electrode serials are uppermost and lowermost first touch electrode serials among the plurality of first touch electrode serials, and the plurality of second proximity/motion sensing electrode serials are leftmost and rightmost second touch electrode serials among the plurality of second touch electrode serials.

Also, the plurality of first proximity/motion sensing electrode serials are disposed at outside uppermost and lowermost first touch electrode serials among the plurality of first touch electrode serials, and the plurality of second proximity/motion sensing electrode serials are disposed at outside leftmost and rightmost second touch electrode serials among the plurality of second touch electrode serials.

Also, the proximity/motion and touch sensor further includes a proximity/motion controller that supplies a proximity/motion driving voltage to the proximity/motion driving electrode and is connected to the uppermost and lowermost first touch electrode serials and the leftmost and rightmost second touch electrode serials; and a touch controller that supplies a touch driving voltage to the first touch electrode serials and connected to the plurality of the second touch electrode serials.

Also, the proximity/motion and touch sensor further includes a proximity/motion controller that supplies a proximity/motion driving voltage to the proximity/motion driving electrode and is connected to the first and second proximity/motion sensing electrode serials; and a touch controller that supplies a touch driving voltage to the first touch electrode serials and connected to the plurality of the second touch electrode serials.

Also, the proximity/motion driving electrode is formed on a first surface of a substrate, and the first and second touch electrode serials are formed on a second surface of the substrate and insulated from each other by an insulation layer.

Also, the proximity/motion driving electrode is formed on a first surface of a substrate, the first and second proximity/motion sensing electrode serials are formed on a second surface of the substrate to separated from each other, the first touch electrode serials are insulate from the second touch electrode serials by an insulation layer, and the first and second touch electrode serials are formed on the second surface of the substrate to be separated from the first and second proximity/motion sensing electrode serials.

Also, the first touch electrode serials are formed on a first surface of a substrate, the proximity/motion driving electrode are formed on an insulation or a polarization plate covering the first touch electrode serials, and the second touch electrode serials are formed on a second surface of the substrate.

Also, the first touch electrode serials and the first proximity/motion sensing electrode serials are formed on a first surface of a substrate to be separated from each other, the proximity/motion driving electrode is formed on an insulation layer or a polarization plate covering the first touch electrode serials, and the second touch electrode serials and the second proximity/motion sensing electrode serials are formed on a second surface of the substrate to separated from each other.

Also, the proximity/motion driving electrode is formed on a first surface of a first substrate, the first touch electrode serials are formed on a second surface of the first substrate, and the second touch electrode serials are formed on an opposite surface of a second substrate opposite to the first touch electrode serials formed on the first substrate.

Also, the proximity/motion driving electrode is formed on a first surface of a first substrate, the first touch electrode serials and the first proximity/motion sensing electrode serials are formed on the first surface of the first substrate to be separated from each other, and the second touch electrode serials and the second proximity/motion sensing electrode serials are formed on an opposite surface of a second substrate opposite to the first touch electrode serials formed on the first substrate.

Also, the proximity/motion driving electrode is formed on a first surface of a substrate, the first touch electrode serials are formed on a second surface of the substrate, and the second touch electrode serials are formed on a surface of a window cover opposite to the first touch electrode serials formed on the substrate.

Also, the proximity/motion driving electrode is formed on a first surface of a substrate, the first touch electrode serials and the first proximity/motion sensing electrode serials are formed on a second surface of the substrate to be separated from each other, and the second touch electrode serials and the second proximity/motion sensing electrode serials are formed on a surface of the window cover opposite to the first touch electrode serials formed on the substrate.

Also, the first touch electrode serials are formed on a window cover, the second touch electrode serials are formed on an insulation layer covering the first touch electrode serials, and the proximity/motion driving electrode is formed on the touch electrode serials with an insulation layer or a polarization plate therebetween.

Also, the first touch electrode serials and the first proximity/motion sensing electrode serials are formed on a window cover to be separated from each other, the second touch electrode serials are formed on an insulation layer covering the first touch electrode serials, and the proximity/motion driving electrode is formed on the second touch electrode serials with an insulation layer or a polarization plate therebetween.

In the constructions, a polarization plate may be formed between the first substrate and the proximity/motion driving electrode.

The proximity/motion and touch sensor according to exemplary embodiments of this disclosure can sense proximity/motion actions as well as touch action. Accordingly, it is possible to achieve an effect capable of easily instructing or selecting information displayed on screens of display devices without directly touching the screens.

BRIEF DESCRIPTION OF THE DRAWINGS

The teachings of the embodiments described herein can be readily understood by considering the following detailed description in conjunction with the accompanying drawings.

DETAILED DESCRIPTION

Figure 1:
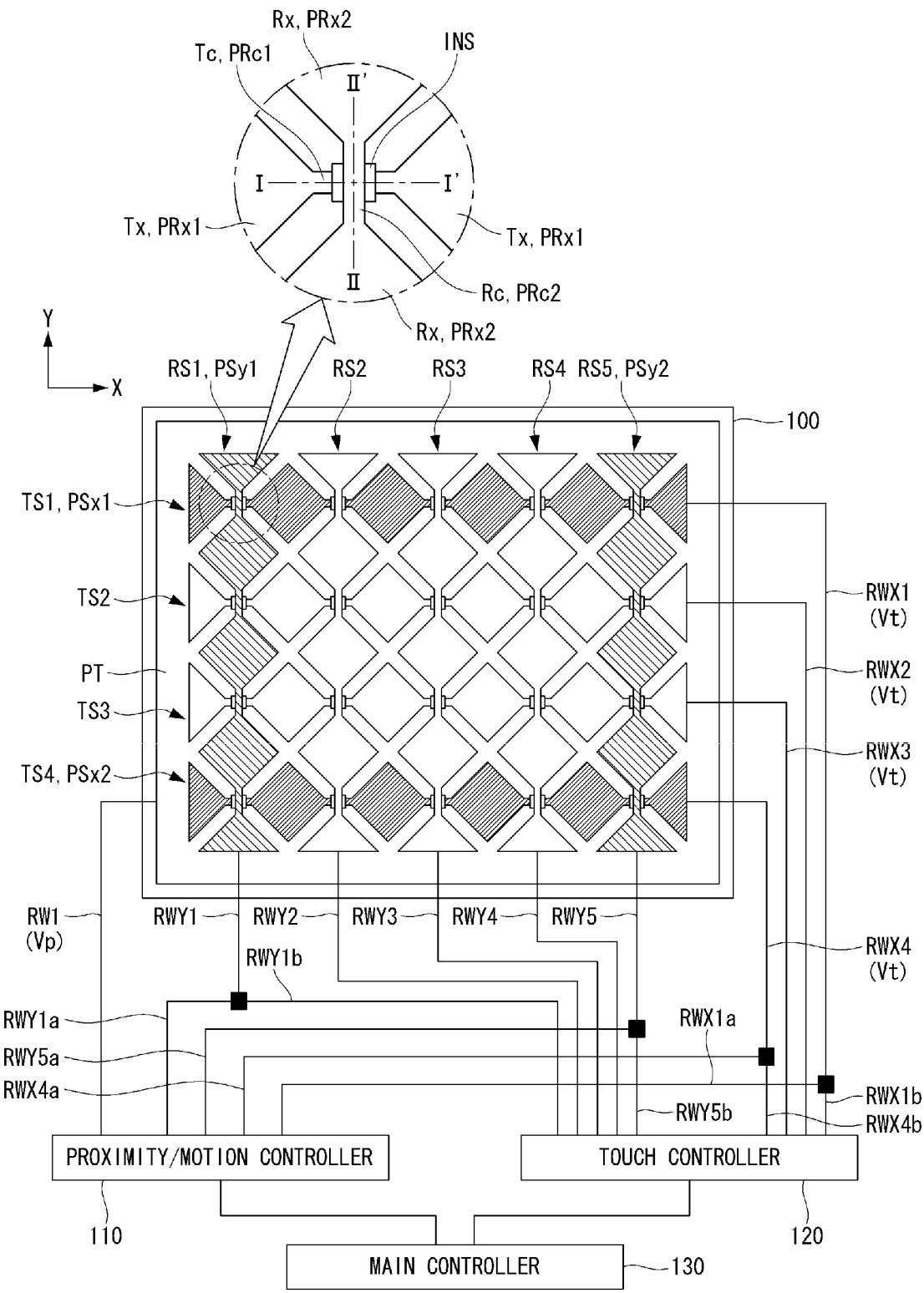
FIG. 1 is a block diagram showing a proximity/motion and touch sensor according to a first exemplary embodiment of this disclosure.

Hereinafter, example embodiments of this disclosure will be described in detail with reference to the accompanying drawings. Like reference numerals and symbols may designate like elements throughout the specification. Herein, terminology "touch" means that a user directly touches a proximity/motion and touch sensor using a detectable input device such as his or her fingers or pen, and "proximity/motion" means that when a user is in close vicinity to a proximity/motion and touch sensor using his or her input device, the user may make particular detectable gestures to the proximity/motion and touch sensor using his or her fingers or pen. The particular gestures include all motions in which the user's input device is moved to the proximity/motion and touch sensor for performing functions such as scroll of web pages or volume up and down. Also, terminology "electrode serial" means that a plurality of electrodes having a predetermined shape are coupled in-line.

Hereinafter, a proximity/motion and touch sensor according to a first exemplary embodiment of this disclosure will be described in detail with reference to FIGS. 1 and 2. FIG. 1 is a block diagram showing a proximity/motion and touch sensor according to the first exemplary embodiment of this disclosure, and FIG. 2 is a cross sectional view taken along with lines I-I' and II-II' of FIG. 1.

Figure 2:
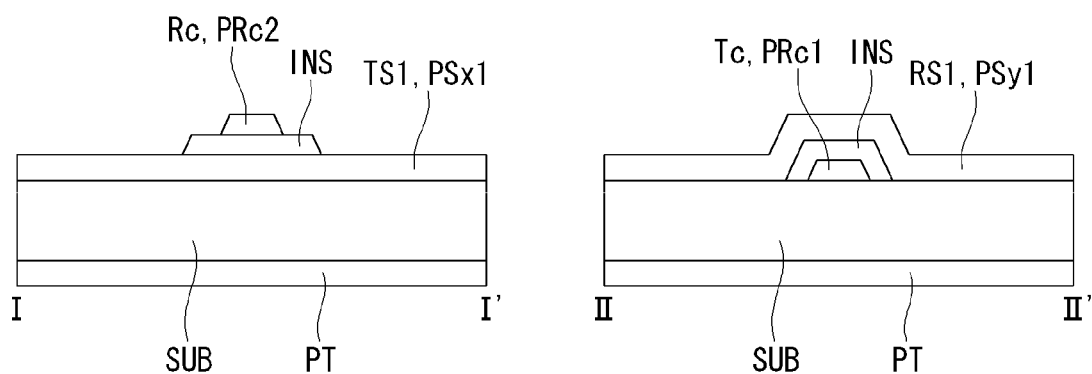
FIG. 2 is a cross sectional view taken along with lines I-I' and II-II' of FIG. 1.

Referring to FIGS. 1 and 2, the proximity/motion and touch sensor according to the first exemplary embodiment of this disclosure includes a proximity/motion and touch sensing part 100, a proximity/motion controller 110, a touch controller 120 and a main controller 130.

The proximity/motion and touch sensing part 100 includes a proximity/motion sensor and a touch sensor. The proximity/motion sensor has a proximity/motion driving electrode PT formed on a first surface of a substrate SUB. In the case of sensors integrated with a display device, the substrate SUB may be formed of a substantially transparent material. The proximity/motion driving electrode PT is formed of one electrode plate. The proximity/motion sensor includes two first proximity/motion sensing electrode serials PSx1 and PSx2, and two second proximity/motion sensing electrode serials PSy1 and PSy2 formed on a second surface opposite to the first surface of the transparent substrate SUB. The first proximity/motion sensing electrode serials PSx1 and PSx2 are arranged at uppermost and lowermost positions of the proximity/motion and touch sensing part 100 in parallel in a first direction (e.g. X axis direction), and the second proximity/motion sensing electrode serials PSy1 and PSy2 are arranged at leftmost and rightmost positions of the proximity/motion and touch sensing part 100 in parallel in a second direction (e.g. Y axis direction) which crosses the first direction. The first proximity/motion sensing electrode serials PSx1 and PSx2 cross over the second proximity/motion sensing electrode serials PSy1 and PSy2. An insulation pattern INS is formed between the first proximity/motion sensing electrode serial PSx1 and PSx2 and the second proximity/motion sensing electrode serials PSy1 and PSy2 at a region where they cross over to each other. The insulation pattern INS insulates the first proximity/motion sensing electrode serial PSx1 and PSx2 from the second proximity/motion sensing electrode serials PSy1 and PSy2.

Each of the first proximity/motion sensing electrode serials PSx1 and PSx2 include a plurality of first proximity/motion sensing electrodes PRx1, and a plurality of first proximity/motion sensing electrode connection portions PRc1 for connecting the first proximity/motion sensing electrodes PRx1 which are neighbored to each other. Each of the second proximity/motion sensing electrode serials PSy1 and PSy2 includes a plurality of second proximity/motion sensing electrodes PRx2, and a plurality of second proximity/motion sensing electrode connection portions PRc2 for connecting the second proximity/motion sensing electrodes PRx2 which are neighbored to each other.

The touch sensor includes a plurality of touch driving electrode serials TS1 to TS4 and a plurality of touch sensing electrode serials RS1 to RS5. The plurality of touch driving electrode serials TS1 to TS4 are arranged in parallel in the first direction on the second surface of the transparent substrate SUB. The plurality of touch sensing electrode serials RS1 to RS5 are arranged in parallel in the second direction on the second surface of the transparent substrate SUB. The plurality of touch driving electrode serials TS1 to TS4 cross over the plurality of touch sensing electrode serials RS. An insulation patterns INS are formed between the touch driving electrode serials TS1 to TS4 and the touch sensing electrode serials RS1 to RS5 at regions where they cross over to each other. The insulation patterns INS insulate the touch driving electrode serials TS from the touch sensing electrode serials RS1 to RS5. Each of the touch driving electrode serials TS1 to TS4 includes a plurality of driving electrode patterns Tx, and a plurality of driving electrode connection portions Tc for connecting the driving electrode patterns Tx which are neighbored to each other. Each of the touch sensing electrode serials RS1 to RS5 includes a plurality of touch sensing electrode patterns Rx, and a plurality of touch sensing electrode connection portions Rc for connecting the touch sensing electrode patterns Rx which are neighbored to each other.

In the proximity/motion and touch sensing part 100 according to the first exemplary embodiment of this disclosure, the two touch driving electrode serials TS1 and TS4 positioned at uppermost and lowermost of the proximity/motion and touch sensing part 100 are same to the two first proximity/motion sensing electrode serials PSx1 and PSx2, and the two touch sensing electrode serials RS1 and RS5 positioned at leftmost and rightmost of the proximity/motion and touch sensing part 100 are same to the two second proximity/motion sensing electrode serials PSy1 and PSy2. That is, the two touch driving electrode serials TS1 and TS4 positioned at uppermost and lowermost of the proximity/motion and touch sensing part 100 performs function of the two first proximity/motion sensing electrode serials PSx1 and PSx2, and the two touch sensing electrode serials RS1 and RS5 positioned at leftmost and rightmost of the proximity/motion and touch sensing part 100 performs function of the two second proximity/motion sensing electrode serials PSy1 and PSy2.

The proximity/motion controller 110 detects whether or not a proximity/motion exists if a user makes particular behaviors to the proximity/motion and touch sensor. For example, the particular behaviors include that the user flips through pages of internet web sites by moving finger or pen, and controls volume-up and volume-down of voice data services, video data services.

For this, the proximity/motion controller 110 is connected to the proximity/motion driving electrode PT through a first routing wire RW1, connected to the uppermost first proximity/motion sensing electrode serial PSx1 through a second routing wire RWX1 and a fourth routing wire RWX1a, connected to the lowermost first proximity/motion sensing electrode serial PSx2 through a second routing wire RWX4 and a fourth routing wire RWX4a, connected to a leftmost second proximity/motion sensing electrode serial PSy1, and connected to the rightmost second proximity/motion sensing electrode serial PSy2 through a third routing wire RWY5 and a fourth routing wire RWY5a.

The proximity/motion controller 110 applies a proximity/motion driving voltage Vp to the proximity/motion driving electrode PT, calculates difference value of mutual capacitances between the proximity/motion driving electrode PT and proximity/motion sensing electrode serials PSx1, PSx2, PSy1 and PSy2 before and after proximity/motion using a proximity/motion recognition algorism, determines whether or not a proximity/motion is performed based on the difference values, and transmits proximity/motion coordinates result indicating whether or not the proximity/motion is performed to the main controller 130.

The touch controller 120 detects whether or not the proximity/motion and touch sensor is touched.

To this end, the touch controller 120 is connected to the uppermost touch driving electrode serial TS1 through a second routing wire RWX1 and fifth routing wire RWX1b, connected to the lowermost touch driving electrode serial TS4 through a second routing wire RWX4 and a fifth routing wire RWX4b, and respectively connected to the middle touch driving electrode serials TS2 and TS3 through a second routing wire RWX2 and RWX3. Also, the touch controller 120 is connected to the leftmost touch sensing electrode serial RS1 through the third routing wire RWY1 and a sixth routing wire RWY1b, connected to the rightmost touch sensing electrode serial RS5 through the third routing wire RWY5 and a sixth routing wire RWY5b, and respectively connected to the middle touch sensing electrode serials RS2, RS3, and RS4 through third routing wires RWY2, RWY3 and RWY4.

The touch controller 120 applies a touch driving voltage Vt to the touch driving electrode serials TS1 to TS4, calculates difference value of mutual capacitances between the touch driving electrode serials TS1 to TS4 and the touch sensing electrode serials RS1 to RS5 before and after touch using a touch recognition algorism, determines whether or not a touch is performed based on the difference values, and transmits touch coordinates indicating positions where touches are performed to the main controller 130.

The main controller 130 controls the proximity/motion controller 110 so that the proximity/motion driving voltage Vp is supplied to the proximity/motion driving electrode PT when the proximity/motion and touch sensor is driven to recognize a proximity/motion. Also, the main controller 130 controls the touch controller 120 so that the touch driving voltage Vt is supplied to the touch driving electrode serials TS1 to TS4 when the proximity/motion and touch sensor is driven to recognize a touch.

In the proximity/motion and touch sensor according to the first exemplary embodiment of this disclosure, each of the first and second proximity/motion sensing electrodes PRx1 and PRx2, the touch driving electrodes Tx, and the touch sensing electrodes Rx is formed of a shape of diamond, but this disclosure does not limited thereto. Each of them may be formed of a triangle, a rectangle, a square, a quadrangle, a polygonal, a circular shape, an elliptical shape, combination shape thereof and the like. Alternatively, each of them may be formed of a bar shape.

Each of the proximity/motion driving electrode PT, the first and second proximity/motion sensing electrode serials PSx1, PSx2, PSy1, and PSy2, the plurality of touch driving electrode serials TS1 To TS4, and the touch sensing electrode serials RS1 to RS5 is formed of a transparent conductive material such as indium tin oxide (ITO), indium zinc oxide (IZO), Gallium-doped Zinc Oxide (GZO), and carbon-based conductive material. Alternatively, each of them may be formed of mesh type metal wires or metal nano-wires.

The insulation patterns INS are formed of inorganic material such as silicon oxide and silicon nitride, or organic resin material such as photo acryl.

In the proximity/motion and touch sensor according to the first exemplary embodiment of this disclosure, although the insulation patterns INS are formed at regions where the touch driving electrode serials TS1 to TS4 cross over the touch sensing electrode serials RS1 to RS5, but this disclosure does not limited thereto. For example, it is possible that bridge patterns are formed on the transparent substrate, an insulation film is formed to cover the bridge patterns and have contact holes exposing at least two portions of each of the bridge patterns, touch driving electrode serials and touch sensing electrode serials are formed on the insulation film so that they cross each other and are non-contacted with each other, and the touch driving electrode serials or touch sensing electrode serials are connected via the bride patterns exposed the contact holes.

The routing wires (e.g., first through sixth) are formed of metal material such as Al, AlNd, Mo, MoTi, Cu, CuOx, Cr, Ag, and Ag-based alloys.

Figure 3A:
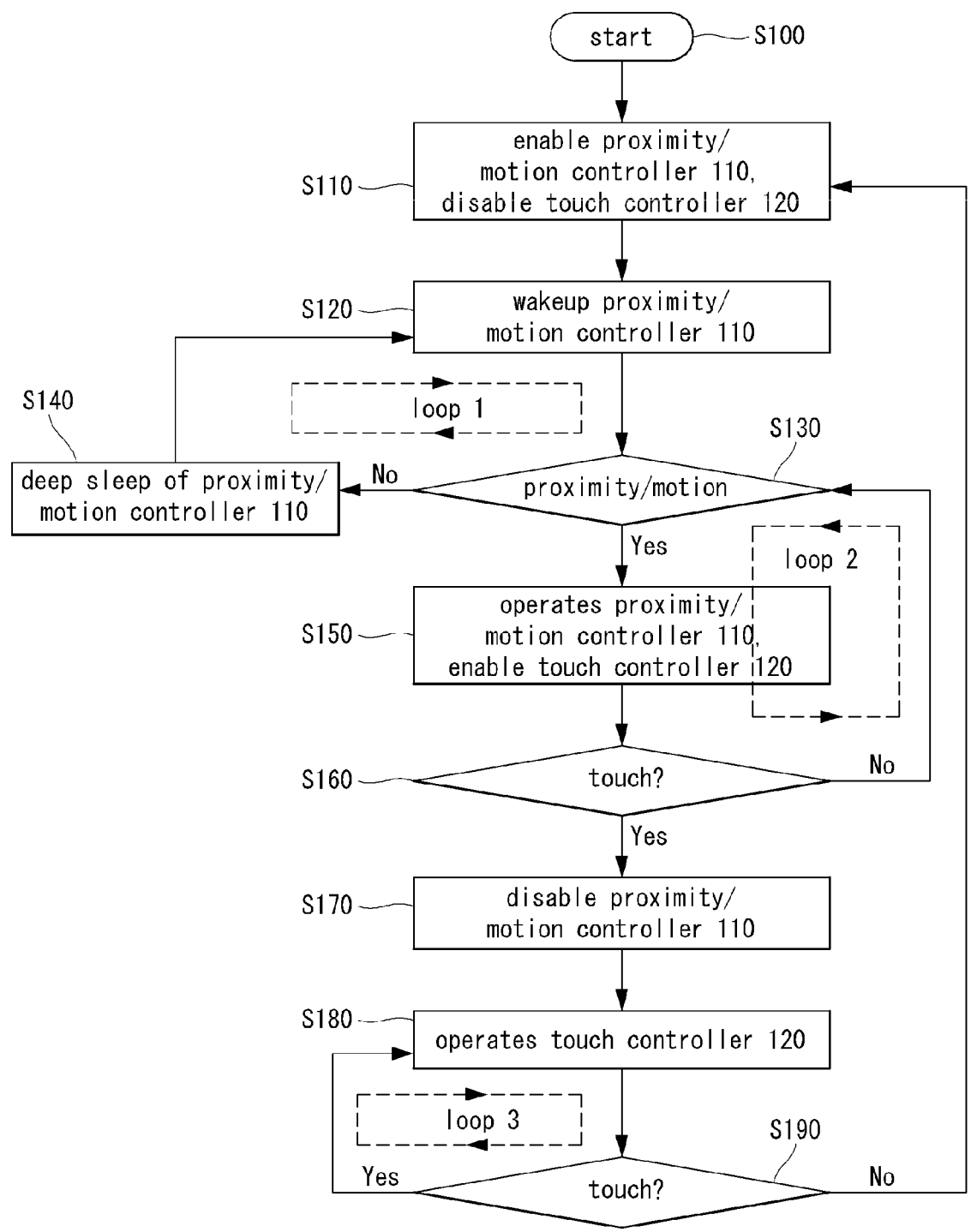
FIG. 3A is a flow chart explaining an operation of the proximity/motion and touch sensor according to a first exemplary embodiment of this disclosure.
Figure 3B:
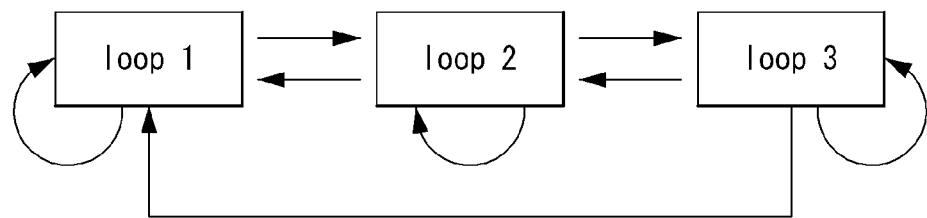
FIG. 3B is a drawing relationship among loops 1 to 3 shown in FIG. 3A.

Hereinafter, the operation of the proximity/motion and touch sensor according to a first exemplary embodiment of this disclosure will be described in detail with reference to FIG. 3A and FIGS. 4A to 4C. FIG. 3A is a flow chart explaining an operation of the proximity/motion and touch sensor according to a first exemplary embodiment, FIG. 3B is a drawing relationship among loops 1 to 3 shown in FIG. 3A, and FIGS. 4A to 4C are timing charts showing driving voltages in the loops 1 to 3.

For convenience of description, the proximity/motion and touch sensor according to the first exemplary embodiment of this disclosure which is applied to portable information telecommunication devices such as mobile phones, PDAs, tablet personal computers, netbook computers is described as an example. Accordingly, this disclosure is not limited to the proximity/motion and touch sensor applied to the portable information telecommunication devices. It should be understood that the proximity/motion and touch sensor according to the first exemplary embodiment of this disclosure can be applied to any technical art that will fall within the scope of the principles of this disclosure.

In general, there are various resolutions for reducing power consumption of the portable information telecommunication devices because a user carries and uses them. For example, if a portable information telecommunication device having a telephone call is powered off for reducing of power consumption, it is impossible for the user to receive telephone call. Accordingly, it is set to a deep sleep mode for minimizing the power consumption during an unused state, and to a wakeup mode woken from the deep-sleep mode when the user has a telephone call or pushes down a certain button. The wakeup mode means a waiting state in which the user can input an instruction to the portable information telecommunication device.

Referring to FIG. 3A and FIGS. 4A to 4C, the proximity/motion and touch sensor according to the first exemplary embodiment of this disclosure, if the portable information telecommunication device is not used during a certain period, the main controller 130 controls the proximity/motion controller 110 to maintain an enable state, and the touch controller 120 to maintain a disable state (S110).

In this state, if a telephone call is received or the user touches a certain button or position of the portable information telecommunication device, the main controller 130 controls the proximity/motion controller 110 to be become the wakeup state (S120).

Figure 4A:
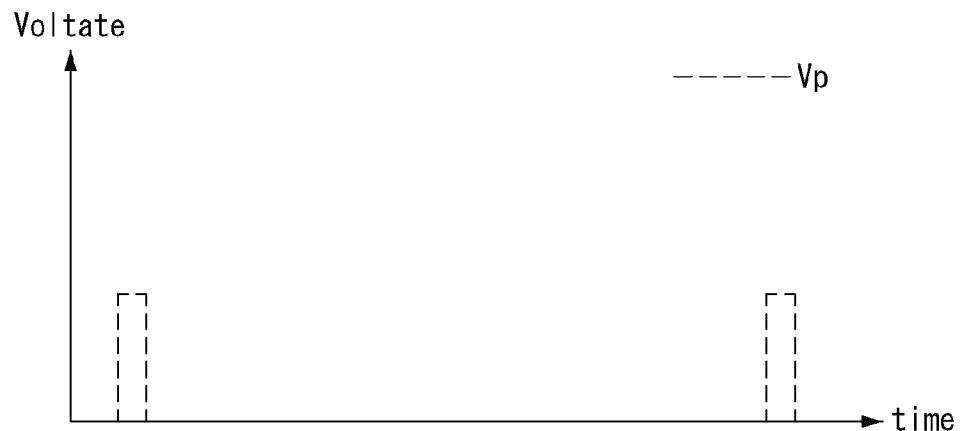
FIGS. 4A to 4C are timing charts showing driving voltages in the loops 1 to 3.

If the proximity/motion controller 110 is in a wakeup state, the proximity/motion controller 110 provides a proximity/motion driving voltage Vp to the proximity/motion driving electrode PT under the control of the main controller 130. The proximity/motion controller 110 periodically supplies the proximity/motion driving voltage Vp having a wave form as shown in FIG. 4A to the proximity/motion driving electrode PT, compares mutual capacitances between the proximity/motion driving electrode PT and the first proximity/motion sensing electrode serials PSx1, PSx2, PSy1 and PSy2 before and after the proximity/motion activity, and supplies the comparing result to the main controller 130 (S130). The main controller 130 determines that no activity exists if a difference between the mutual capacitances does not exist (No of S130), and control the proximity/motion controller 110 to maintain a deep-sleep state. On the other hand, the main controller 130 determines that an activity of the proximity/motion exists if a difference between the mutual capacitances exists (Yes S130). And then the main controller 130 controls the proximity/motion controller 110 to maintain an operation state, and controls the touch controller 120 to maintain an enable state (S150).

If a telephone call is received or the user touches a certain button or position when the proximity/motion controller 110 maintains the deep-sleep state, the main controller 130 supplies a wakeup signal to the proximity/motion controller 110 so that the proximity/motion controller 110 maintains a wakeup state (S120).

If the touch controller 120 becomes an enable state, the touch controller 120 determines whether or not a touch activity is performed to the proximity/motion and touch sensing part 100 (S160). The proximity/motion controller 110 supplies the proximity/motion driving voltage Vt to the proximity/motion driving electrode PT, and the touch controller 120 supplies the touch driving voltage Vt to the touch driving electrode serials TS1 to TS4 until the touch controller 120 determines that a touch activity exists. The touch controller 120 also compares mutual capacitances between the touch driving electrode serials TS1 to TS4 and the touch sensing electrode serials RS1 to RS5 before and after a touch activity and supplies the compared result to the main controller 130 (S160).

The main controller 130 determines that a touch activity does not exist if a difference between the mutual capacitances does not exist according to the compared result (No of S160), and controls the proximity/motion controller 110 and the touch controller 120 to maintain the state at step S150. On the other hand, the main controller 130 determines that a touch activity exists if a difference between the mutual capacitances exists according to the compared result (Yes of S160), and controls the proximity/motion controller 110 to maintain a disable state and the touch controller 120 to maintain an operation state (S180).

The touch controller 120 may detect another touch activity (S190). If another touch activity exists (Yes of S190), the touch controller 120 returns to the step S180 to detect further another touch activity. If another touch activity does not exist ("No" in step S190), the main controller 130 controls the proximity/motion controller 110 to maintain the enable state and the touch controller 120 to maintain the disable state (S110).

Hereafter, the operations of the proximity/motion controller 110 and the touch controller 120 for loops 1 to 3 will be described in detail with reference to FIG. 3b and FIGS. 4A to 4C. The loop 1 means that any proximity/motion activity does not exists. In the loop 1, the proximity/motion controller 110 becomes an enable state but the touch controller 120 becomes a disable state. Accordingly, it is determined whether or not a proximity/motion exists in the loop 1. At this time, the proximity/motion controller 110 supplies a first proximity/motion driving voltage Vp having a predetermined period and wave form as shown in FIG. 4A to the proximity/motion driving electrode PT.

Figure 4B:
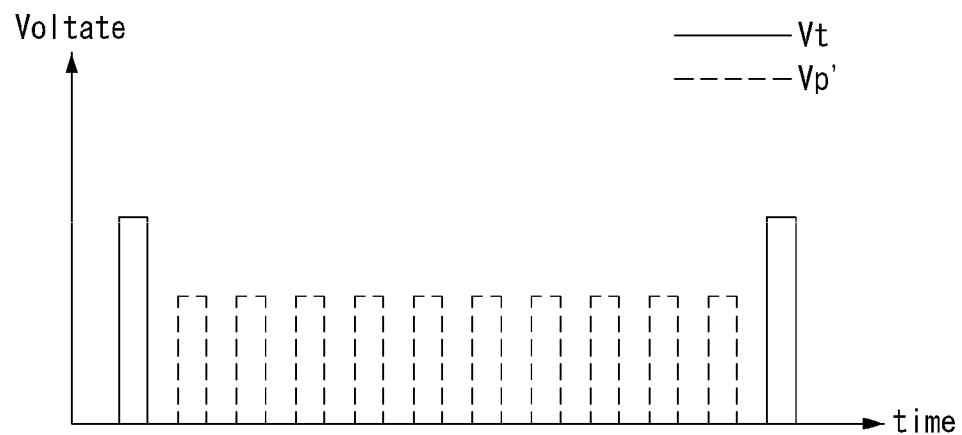

The loop 2 means that any proximity/motion activity exists. In the loop 2, the touch controller 120 becomes an enable state to determine whether or not a touch activity exists. In the loop 2, the proximity/motion controller 110 supplies a second proximity/motion driving voltage Vp' to the proximity/motion driving electrode PT, and the touch controller 120 supplies a first touch driving voltage Vt to the touch driving electrode serials TS1 to TS4. The second proximity/motion driving voltage Vp' has a period shorter than that of the first proximity/motion driving voltage Vp as shown in FIGS. 4A and 4B.

Figure 4C:
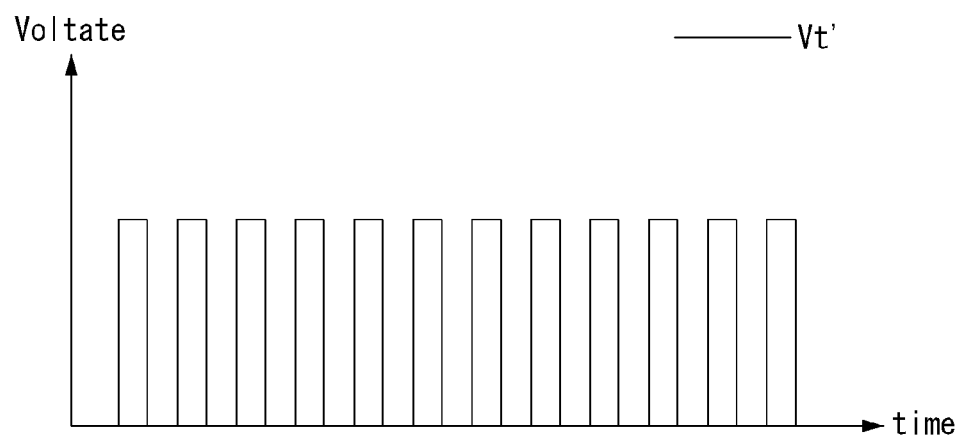

The loop 3 means that a touch activity exists. In the loop 3, the proximity/motion controller 110 becomes a disable state, and the touch controller 120 becomes an enable state. Accordingly, the proximity/motion controller 110 and the touch controller 120 are operated for a touch sensing operation. In the loop 3, the touch controller 120 supplies a second touch driving voltage Vt' to the touch driving electrode serials TS1 to TS4. The second touch driving voltage Vt' has a period shorter than that of the first touch driving voltage Vt as shown in FIGS. 4B and 4C.

Hereinafter, a proximity/motion and touch sensor according to a second exemplary embodiment of this disclosure will be described in detail with reference to FIGS. 5 and 6.

Figure 5:
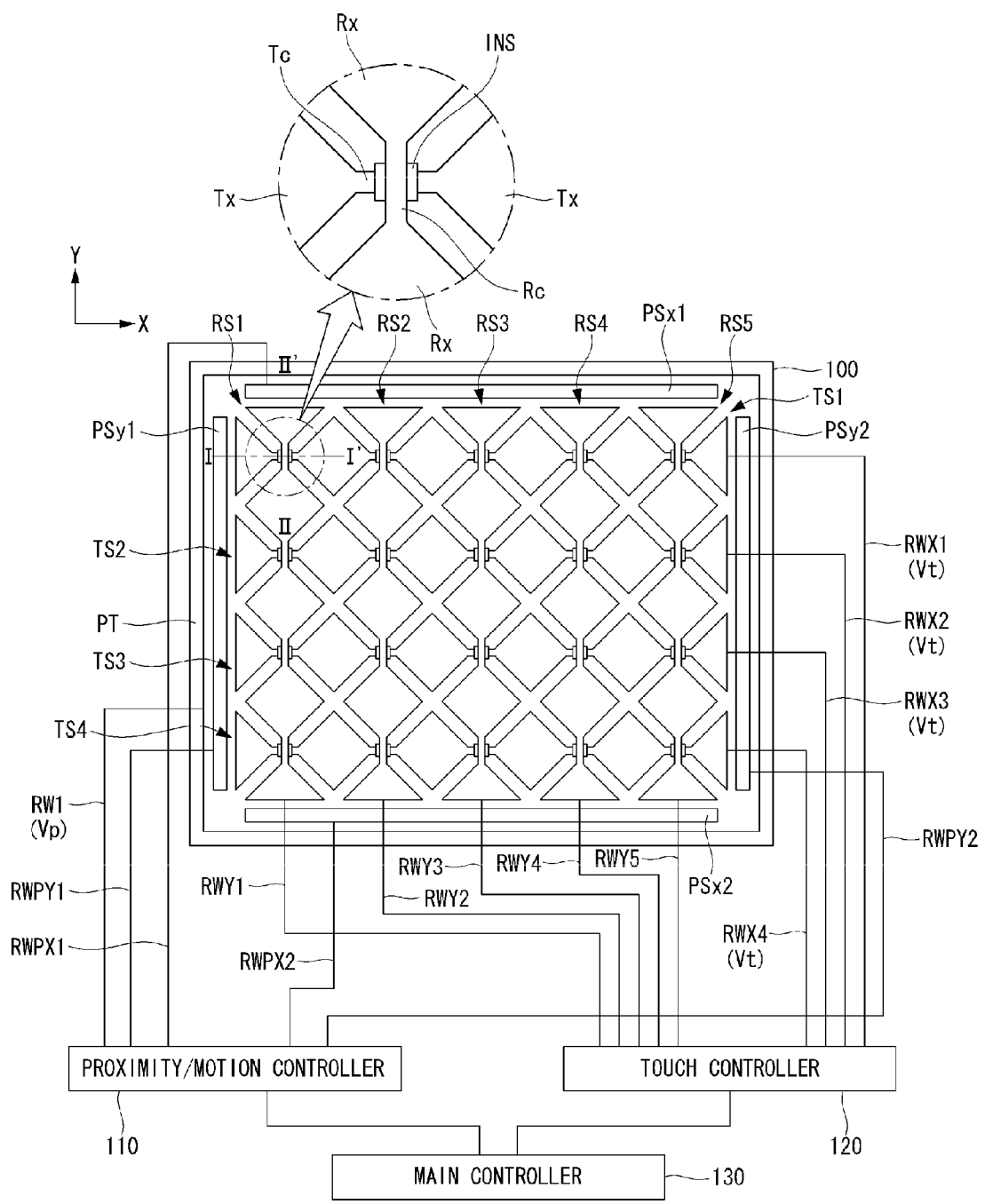
FIG. 5 is a block diagram showing a proximity/motion and touch sensor according to a second exemplary embodiment of this disclosure.
Figure 6:
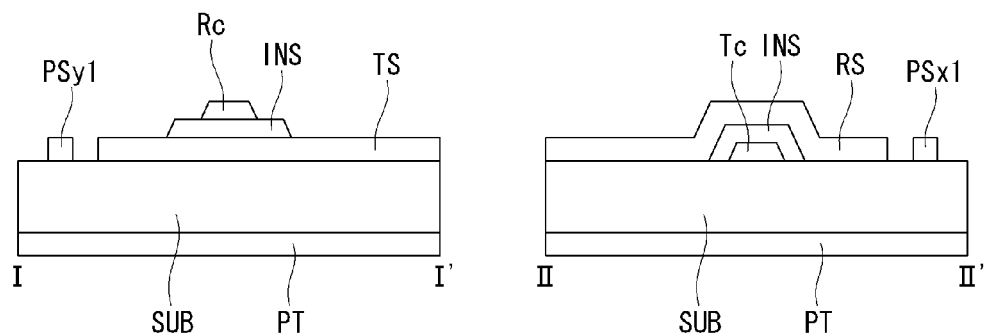
FIG. 6 is a cross-sectional view taken along with lines I-I' and II-II' of FIG. 5.

Referring to FIGS. 5 and 6, the proximity/motion and touch sensor according to the second exemplary embodiment of this disclosure includes a proximity/motion and touch sensing part 100, a proximity/motion controller 110, a touch controller 120 and a main controller 130.

The proximity/motion and touch sensing part 100 includes a proximity/motion sensor and a touch sensor. The proximity/motion sensor has a proximity/motion driving electrode PT formed on a first surface of a substantially transparent substrate SUB. The proximity/motion driving electrode PT is formed of one electrode plate. The proximity/motion sensor includes two first proximity/motion sensing electrode serials PSx1 and PSx2, and two second proximity/motion sensing electrode serials PSy1 and PSy2 formed on a second surface opposite to the first surface of the substrate SUB. The first proximity/motion sensing electrode serials PSx1 and PSx2 are arranged at uppermost and lowermost positions of the proximity/motion and touch sensing part 100 in parallel in a first direction (e.g. X axis direction), and the second proximity/motion sensing electrode serials PSy1 and PSy2 are arranged at leftmost and rightmost positions of the proximity/motion and touch sensing part 100 in parallel in a second direction (e.g. Y axis direction) which crosses the first direction. The first proximity/motion sensing electrode serials PSx1 and PSx2 are separated from the second proximity/motion sensing electrode serials PSy1 and PSy2.

The proximity/motion and touch sensor includes a plurality of touch driving electrode serials TS1 to TS4 and a plurality of touch sensing electrode serials RS1 to RS5. The plurality of touch driving electrode serials TS1 to TS4 are arranged in parallel in the first direction on the second surface of the transparent substrate SUB. The plurality of touch sensing electrode serials RS1 to RS5 are arranged in parallel in the second direction on the second surface of the transparent substrate SUB. The plurality of touch driving electrode serials TS1 to TS4 cross over the plurality of touch sensing electrode serials RS1 to RS5. Insulation patterns INS are formed between the touch driving electrode serials TS1 to TS4 and the touch sensing electrode serials RS1 to RS5 at regions where they cross over to each other. The insulation patterns INS insulate the touch driving electrode serials TS1 to TS4 from the touch sensing electrode serials RS1 to RS5. Each of the touch driving electrode serials TS1 to TS4 includes a plurality of driving electrode patterns Tx and a plurality of driving electrode connection portions Tc for connecting the driving electrode patterns Tx which are neighbored to each other. Each of the touch sensing electrode serials RS1 to RS5 includes a plurality of touch sensing electrode patterns Rx, and a plurality of touch sensing electrode connection portions Rc for connecting the touch sensing electrode patterns Rx which are neighbored to each other.

The proximity/motion sensor according to the second exemplary embodiment of this disclosure is different from the proximity/motion sensor according to the first exemplary embodiment of this disclosure in that the first and second proximity/motion sensing electrode serials PSx1, PSx2, PSy1 and PSy2 are formed at outside from area where the touch driving electrode serials TS1 to TS4 and the touch sensing electrode serials RS1 to RS5 of the proximity/motion and touch sensor are formed.

The proximity/motion controller 110 detects whether or not a proximity/motion exists if a user makes particular behaviors to the proximity/motion and touch sensor. For example, the particular behaviors include that the user flips through pages of internet web sites by moving finger or pen, and controls volume-up and volume-down of voice data services, video data services.

For this, the proximity/motion controller 110 is connected to the proximity/motion driving electrode PT through a first routing wire RW1, connected to the uppermost first proximity/motion sensing electrode serial PSx1 through a (7-1)th routing wire RWPX1, connected to the lowermost first proximity/motion sensing electrode serial PSx2 through a (7-2)th routing wire RWPX2, connected to a leftmost second proximity/motion sensing electrode serial PSy1 through a (8-1)th routing wire RWPY1, and connected to the rightmost second proximity/motion sensing electrode serial PSy2 through a (8-2)th routing wire RWPY2.

The proximity/motion controller 110 applies a proximity/motion driving voltage Vp to the proximity/motion driving electrode PT, calculates difference value of mutual capacitances between the proximity/motion driving electrode PT and the proximity/motion sensing electrode serials PSx1, PSx2, PSy1 and PSy2 before and after proximity/motion using a proximity/motion recognition algorithm, determines whether or not the proximity/motion is performed based on the difference values, and transmits proximity/motion coordinates indicating whether or not the proximity/motion is performed to the main controller 130.

The touch controller 120 detects whether or not the proximity/motion and touch sensor is touched.

To this end, the touch controller 120 is connected to the touch driving electrode serials TS1 to TS4 through second routing wires RWX1, RWX2, RWX3 and RWX4, and connected to the touch sensing electrode serials RS1 to RS5 through third routing wires RWY1, RWY2, RWY3, RWY4 and RWY5.

The touch controller 120 applies a touch driving voltage Vt to the touch driving electrode serials TS1 to TS4, calculates difference value of mutual capacitances between the touch driving electrode serials TS1 to TS4 and the touch sensing electrode serials RS1 to RS5 before and after touch using a touch recognition algorism, determines whether or not a touch is performed based on the difference values, and transmits touch coordinates indicating positions where the touch are performed to the main controller 130.

The main controller 130 controls the proximity/motion controller 110 so that the proximity/motion driving voltage Vp is supplied to the proximity/motion driving electrode PT during the proximity/motion and touch sensor is driven to recognize a proximity/motion. Also, the main controller 130 controls the touch controller 120 so that the touch driving voltage Vt is supplied to the touch driving electrode serials TS1 to TS4 during the proximity/motion and touch sensor is driven to recognize a touch.

In the proximity/motion and touch sensor according to the second exemplary embodiment of this disclosure, each of the touch driving electrodes Tx and the touch sensing electrodes Rx is formed of a shape of diamond, but this disclosure does not limited thereto. Each of them may be formed of a triangle, a rectangle, a square, a quadrangle, a polygonal, a circular shape, an elliptical shape, combination shape thereof and the like. Alternatively, each of them may be formed of a bar shape.

Each of the proximity/motion driving electrode PT, the first and second proximity/motion sensing electrode serials PSx1, PSx2, PSy1, and PSy2, the plurality of touch driving electrode serials TS1 To TS4, and the touch sensing electrode serials RS1 to RS5 is formed of a transparent conductive material such as indium tin oxide (ITO), indium zinc oxide (IZO), Gallium-doped Zinc Oxide (GZO), and carbon-based conductive material. Alternatively, each of them may be formed of mesh type metal wires or metal nano-wires.

The insulation patterns INS are formed of inorganic material such as silicon oxide and silicon nitride, or organic resin material such as photo acryl.

In the proximity/motion and touch sensor according to the second exemplary embodiment of this disclosure, although the insulation patterns INS are formed at regions where the touch driving electrode serials TS1 to TS4 cross over the touch sensing electrode serials RS1 to TS5, but this disclosure does not limited thereto. For example, it is possible that bridge patterns are formed on the transparent substrate, an insulation film is formed to cover the bridge patterns and have contact holes exposing at least two portions of each of the bridge patterns, touch driving electrode serials and touch sensing electrode serials are formed on the insulation film so that they cross each other and are non-contacted with each other, and the touch driving electrode serials or touch sensing electrode serials are connected via the bride patterns exposed the contact holes.

The routing wires (e.g., first to third and the seventh to eighth) are formed of metal material such as Al, AlNd, Mo, MoTi, Cu, CuOx, Cr, Ag, and Ag-based alloys.

The descriptions for the operations of the proximity/motion sensor and the proximity/motion and touch sensor according to a first exemplary embodiment of this disclosure will be omitted because they are same to those of the first exemplary embodiment of this disclosure.

In the description of the first and second exemplary embodiments of this disclosure, the proximity/motion sensing electrode serials, touch driving electrode serials and touch sensing electrode serials are formed on one surface of the substrate and the proximity/motion driving electrode is formed on another surface of the substrate. However this disclosure is not limited thereto.

Figure 11:
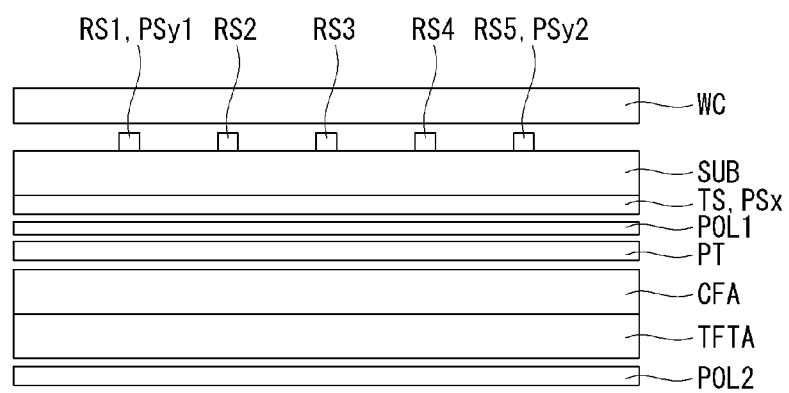
FIG. 11 is a cross-sectional view schematically showing an example in which the proximity/motion and touch sensor according to a third exemplary embodiment of this disclosure is applied to a liquid crystal display device.
Figure 12:
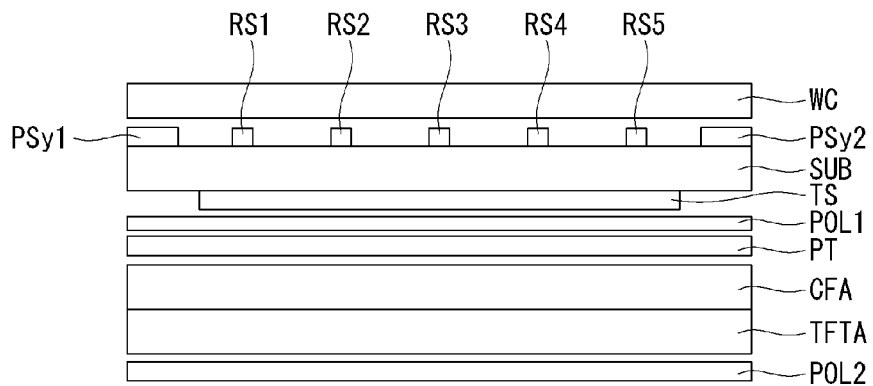
FIG. 12 is a cross-sectional view schematically showing an example in which the proximity/motion and touch sensor according to a fourth exemplary embodiment of this disclosure is applied to a liquid crystal display device.

For example, in proximity/motion and touch sensors according to a third and fourth exemplary embodiments of this disclosure, touch driving electrode serials TS and first proximity/motion sensing electrode serials PSx are formed on one surface of the substrate, second proximity/motion sensing electrode serials PSy1 and PSy2 and touch sensing electrode serials are formed on another surface of the substrate SUB, proximity/motion driving electrode PT is formed on a polarization plate or an insulation layer formed on the proximity/motion sensing electrode PSx and touch driving electrode serials TS as shown FIGS. 11 and 12. The proximity/motion sensing electrode serials PSx, PSy1 and PSy2 in the third exemplary embodiment are same to the uppermost and lowermost touch driving electrode serials and leftmost and rightmost touch sensing electrode serials similar to the first exemplary embodiment, and the first and second proximity/motion sensing electrode serials PSy1 and PSy2 in the fourth exemplary embodiment are separated from the touch driving electrode serials TS and touch sensing electrode serials RS1 to RS5 similar to the second exemplary embodiment.

Figure 15:
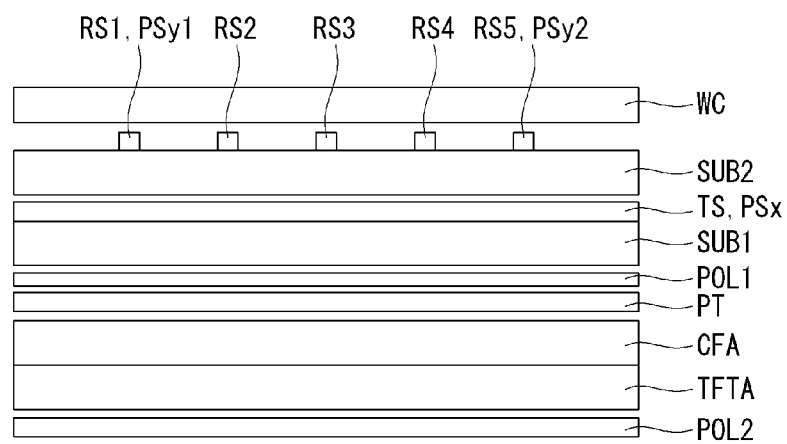
FIG. 15 is a cross-sectional view schematically showing an example in which the proximity/motion and touch sensor according to a fifth exemplary embodiment of this disclosure is applied to a liquid crystal display device.
Figure 16:
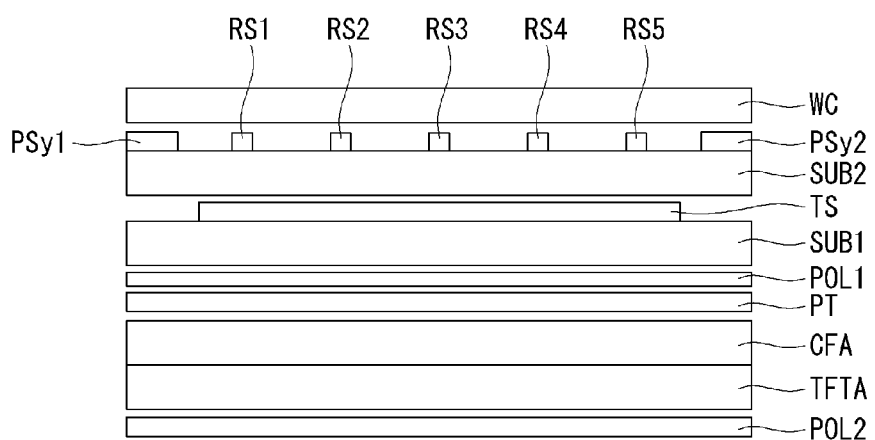
FIG. 16 is a cross-sectional view schematically showing an example in which the proximity/motion and touch sensor according to a sixth exemplary embodiment of this disclosure is applied to a liquid crystal display device.

In proximity/motion and touch sensors according to a fifth and sixth exemplary embodiments of this disclosure, first proximity/motion sensing electrode serials PSx and touch driving electrode serials TS are formed on one surface of a first substrate SUB1, touch sensing electrode serials RS1 to RS5 and second proximity/motion sensing electrode serials PSy1 and PSy2 are formed on one surface of a second substrate SUB2 which is opposed to the first substrate SUB1, and proximity/motion driving electrode PT is formed on another surface of the first substrate SUB1 as shown in FIGS. 15 and 16. The proximity/motion sensing electrode serials of the fifth exemplary embodiment are same to the uppermost and lowermost touch driving electrode serials and leftmost and rightmost touch sensing electrode serials similar to the first exemplary embodiment, and the first and second proximity/motion sensing electrode serials of the sixth exemplary embodiment are separated from the touch driving electrode serials and touch sensing electrode serials similar to the second exemplary embodiment.

Figure 19:
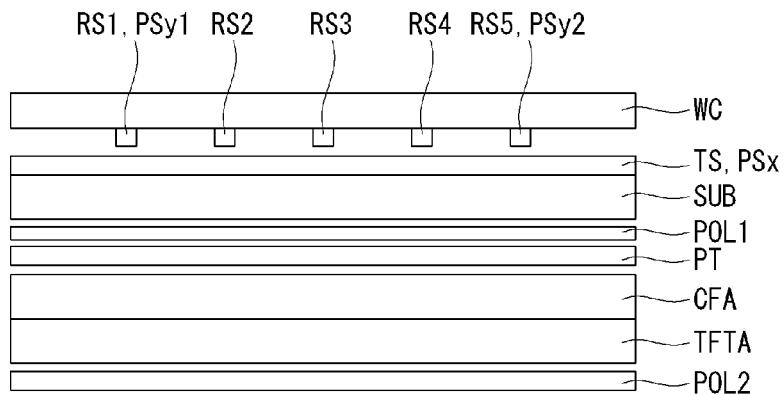
FIG. 19 is a cross-sectional view schematically showing an example in which the proximity/motion and touch sensor according to a seventh exemplary embodiment of this disclosure is applied to a liquid crystal display device.
Figure 20:
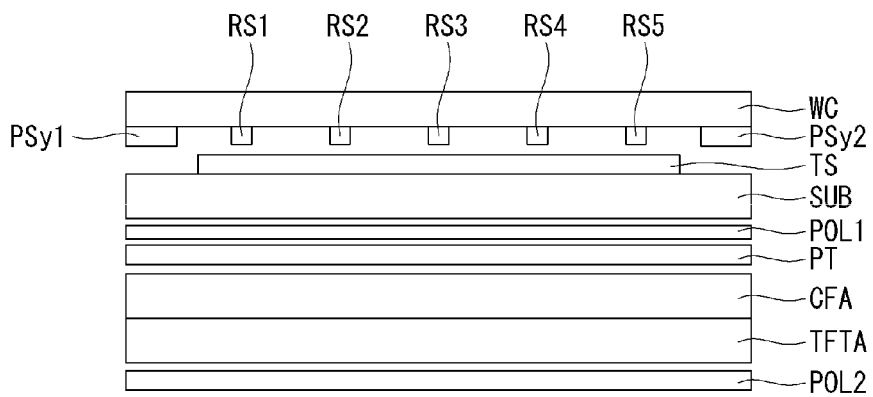
FIG. 20 is a cross-sectional view schematically showing an example in which the proximity/motion and touch sensor according to an eighth exemplary embodiment of this disclosure is applied to a liquid crystal display device.

In proximity/motion and touch sensors according to a seventh and eighth exemplary embodiments of this disclosure, second proximity/motion sensing electrode serials PSy1 and PSy2 and touch sensing electrode serials RS1 to RS5 are formed on one surface of a window cover WC, touch driving electrode serials TS and first proximity/motion sensing electrode serials PSx are formed on one surface of a substrate SUB, and proximity/motion driving electrode PT is formed on another surface of the substrate SUB as shown in FIGS. 19 and 20. The proximity/motion sensing electrode serials PSx, PSy1 and PSy2 of the seventh exemplary embodiment are same to the uppermost and lowermost touch driving electrode serials and leftmost and rightmost touch sensing electrode serials similar to the first exemplary embodiment, and the first and second proximity/motion sensing electrode serials of the eighth exemplary embodiment are separated from the touch driving electrode serials and touch sensing electrode serials similar to the second exemplary embodiment.

In proximity/motion and touch sensors according to a ninth and tenth exemplary embodiments of this disclosure, second proximity/motion sensing electrode serials PSx, PSy1 and PSy2 and touch sensing electrode serials RS1 to RS5 are formed on one surface of a window cover WC, and touch driving electrode serials TS and first proximity/motion sensing electrode serials PSx are formed on an insulation layer INS which covers second proximity/motion sensing electrode serials PSy1 and PSy2 and touch sensing electrode serials RS1 to RS5. The first and second proximity/motion sensing electrode serials PSx an PSy of the ninth exemplary embodiment are same to the uppermost and lowermost touch driving electrode serials and leftmost and rightmost touch sensing electrode serials similar to the first exemplary embodiment, and the proximity/motion sensing electrode serials of the tenth exemplary embodiment are separated from the touch driving electrode serials and touch sensing electrode serials similar to the second exemplary embodiment.

Next, display devices having the proximity/motion and touch sensors according to the first to tenth exemplary embodiments of this disclosure will be described in detail with reference to FIGS. 7 to 26. FIGS. 7 to 27 are cross-sectional views illustrating examples in which the proximity/motion and touch sensors according to the first to tenth exemplary embodiments of this disclosure are applied to liquid crystal display devices or organic light emit diode display devices. Reference symbol WC in the examples shown in FIGS. 7 to 26 indicates a window cover for protecting the proximity/motion and touch sensor applied to the display devices.

Figure 7:
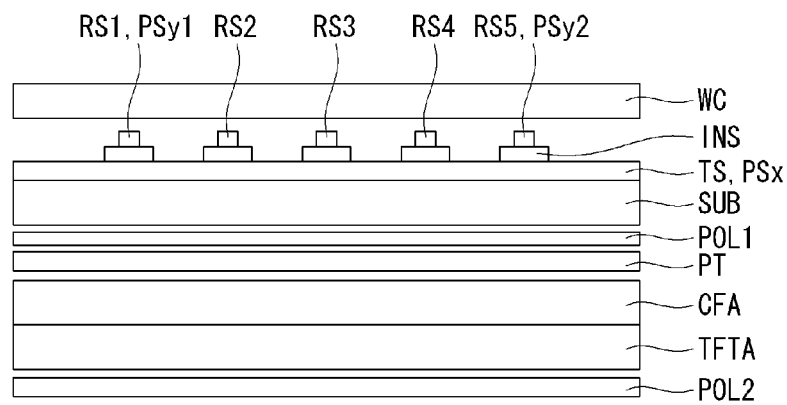
FIG. 7 is a cross-sectional view schematically showing an example in which the proximity/motion and touch sensor according to the first exemplary embodiment of this disclosure is applied to a liquid crystal display device.

FIG. 7 is a cross-sectional view schematically showing an example in which the proximity/motion and touch sensor according to the first exemplary embodiment of this disclosure is applied to a liquid crystal display device. Referring to FIG. 7, the liquid crystal display device includes a thin film transistor array TFTA, a color filter array CFA and a liquid crystal layer (not shown) between the thin film transistor array TFTA and the color filter array CFA. The color filter array CFA includes an upper polarization plate POL1 formed on an upper surface thereof, and the thin film transistor array TFTA includes a lower polarization plate POL2 formed on a lower surface thereof. In case the proximity/motion and touch sensor according to the first exemplary embodiment of this disclosure is applied to the liquid crystal display device, the proximity/motion driving electrode PT is disposed between the upper polarization plate POL1 and the color filter array CFA.

Figure 8:
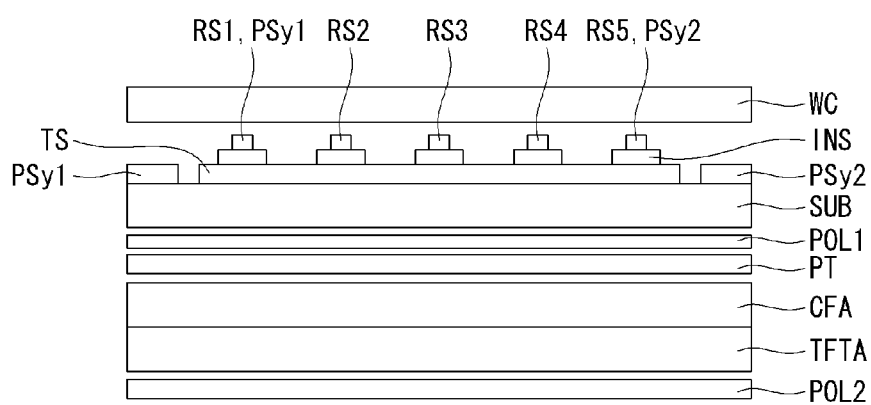
FIG. 8 is a cross-sectional view schematically showing an example in which the proximity/motion and touch sensor according to the second exemplary embodiment of this disclosure is applied to a liquid crystal display device.

FIG. 8 is a cross-sectional view schematically showing an example in which the proximity/motion and touch sensor according to the second exemplary embodiment of this disclosure is applied to a liquid crystal display device. Referring to FIG. 8, the liquid crystal display device has the same construction the liquid crystal display device shown in FIG. 7. The proximity/motion driving electrode PT of the proximity/motion and touch sensor according to the second exemplary embodiment of this disclosure is disposed between the upper polarization plate POL1 and the color filter array CFA.

Figure 9:
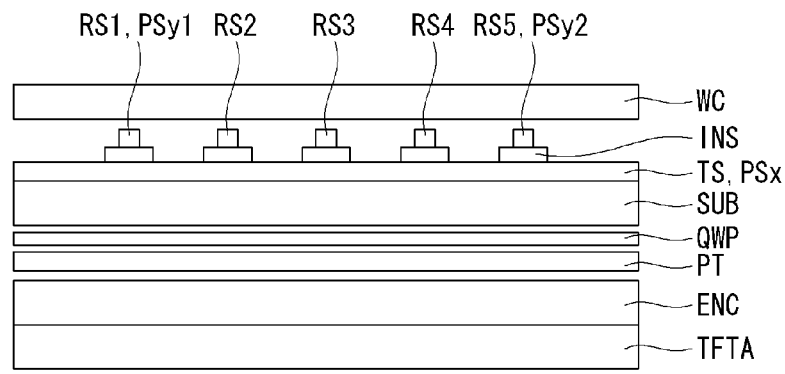
FIG. 9 is a cross-sectional view schematically showing an example in which the proximity/motion and touch sensor according to the first exemplary embodiment of this disclosure is applied to an organic light emitting diode display device.

FIG. 9 is a cross-sectional view schematically showing an example in which the proximity/motion and touch sensor according to the first exemplary embodiment of this disclosure is applied to an organic light emitting display device. Referring to FIG. 9, the organic light emitting display device includes a thin film transistor array TFTA having organic light emitting elements, and an encapsulator ENC for protecting the thin film transistor array TFTA. The encapsulator ENC includes a quarter-wave polarization plate QWP formed on an upper surface thereof to prevent external light from being reflected. In case the proximity/motion and touch sensor according to the first exemplary embodiment of this disclosure is applied to the organic light emitting display device, the proximity/motion driving electrode PT is disposed between the quarter-wave polarization plate QWP and the encapsulator ENC.

Figure 10:
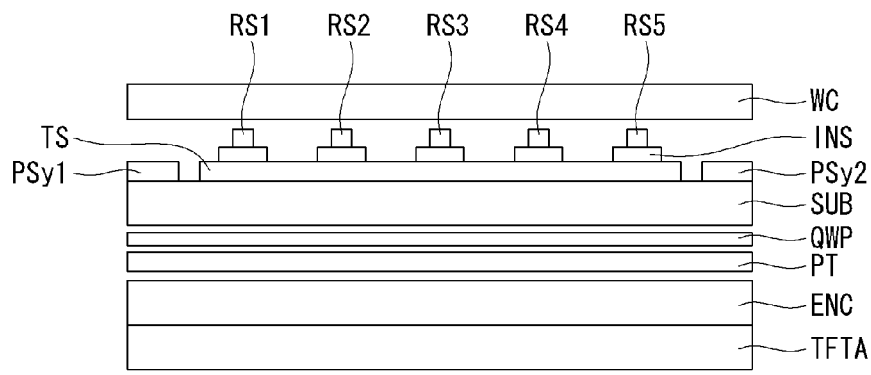
FIG. 10 is a cross-sectional view schematically showing an example in which the proximity/motion and touch sensor according to the second exemplary embodiment of this disclosure is applied to an organic light emitting diode display device.

FIG. 10 is a cross-sectional view schematically showing an example in which the proximity/motion and touch sensor according to the second exemplary embodiment of this disclosure is applied to an organic light emitting display device. Referring to FIG. 10, the organic light emitting display device has the same construction as the organic light emitting display device shown in FIG. 9. The proximity/motion driving electrode PT according to the second exemplary embodiment of this disclosure is disposed between the quarter-wave polarization plate QWP and the encapsulator ENC.

FIG. 11 is a cross-sectional view schematically showing an example in which the proximity/motion and touch sensor according to the third exemplary embodiment of this disclosure is applied to a liquid crystal display device. Referring to FIG. 11, the liquid crystal display device includes a thin film transistor array TFTA, a color filter array CFA and a liquid crystal layer (not shown) between the thin film transistor array TFTA and the color filter array CFA. The color filter array CFA includes an upper polarization plate POL1 formed on an upper surface thereof, and the thin film transistor array TFTA includes a lower polarization plate POL2 formed on a lower surface thereof. In case the proximity/motion and touch sensor according to the third exemplary embodiment of this disclosure is applied to the liquid crystal display device, the proximity/motion driving electrode PT is disposed between the upper polarization plate POL1 and the color filter array CFA.

FIG. 12 is a cross-sectional view schematically showing an example in which the proximity/motion and proximity/motion and touch sensor according to the fourth exemplary embodiment of this disclosure is applied to a liquid crystal display device. Referring to FIG. 12, the liquid crystal display device has the same construction the liquid crystal display device shown in FIG. 7. The proximity/motion driving electrode PT of the proximity/motion and touch sensor according to the fourth exemplary embodiment of this disclosure is disposed between the upper polarization plate POL1 and the color filter array CFA.

Figure 13:
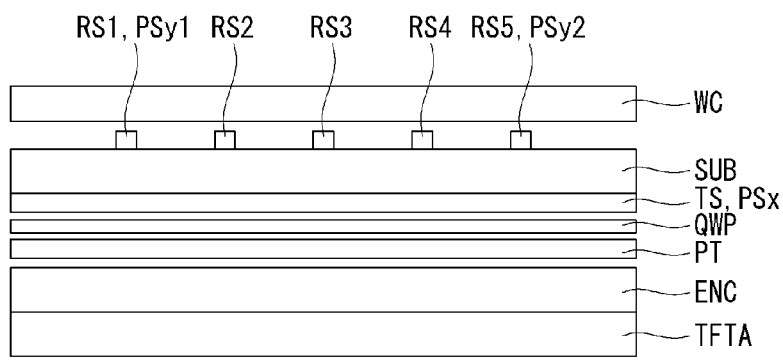
FIG. 13 is a cross-sectional view schematically showing an example in which the proximity/motion and touch sensor according to the third exemplary embodiment of this disclosure is applied to an organic light emitting diode display device.

FIG. 13 is a cross-sectional view schematically showing an example in which the proximity/motion and touch sensor according to the third exemplary embodiment of this disclosure is applied to an organic light emitting display device. Referring to FIG. 13, the organic light emitting display device includes a thin film transistor array TFTA having organic light emitting elements, and an encapsulator ENC for protecting the thin film transistor array TFTA. The encapsulator ENC includes a quarter-wave polarization plate QWP formed on an upper surface thereof to prevent external light from being reflected. In case the proximity/motion and touch sensor according to the third exemplary embodiment of this disclosure is applied to the organic light emitting display device, the proximity/motion driving electrode PT of the proximity/motion and touch sensor according to the third exemplary embodiment of this disclosure is disposed between the quarter-wave polarization plate QWP and the encapsulator ENC.

Figure 14:
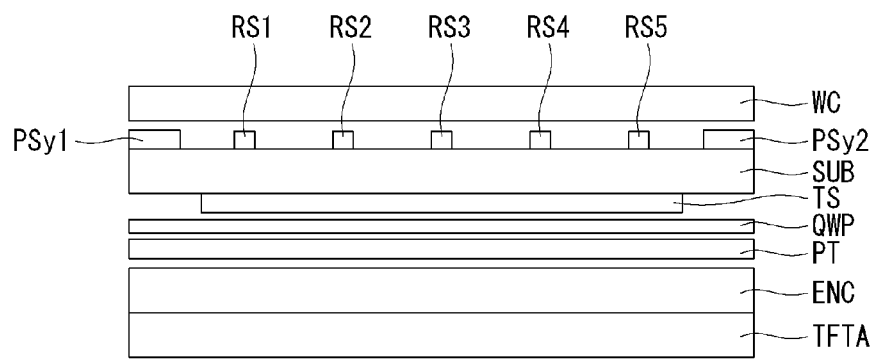
FIG. 14 is a cross-sectional view schematically showing an example in which the proximity/motion and touch sensor according to the fourth exemplary embodiment of this disclosure is applied to an organic light emitting diode display device.

FIG. 14 is a cross-sectional view schematically showing an example in which the proximity/motion and touch sensor according to the fourth exemplary embodiment of this disclosure is applied to an organic light emitting display device. Referring to FIG. 14, the organic light emitting display device has the same construction as the organic light emitting display device shown in FIG. 9. The proximity/motion driving electrode PT of the proximity/motion and touch sensor according to the fourth exemplary embodiment of this disclosure is disposed between the quarter-wave polarization plate QWP and the encapsulator ENC.

FIG. 15 is a cross-sectional view schematically showing an example in which the proximity/motion and touch sensor according to the fifth exemplary embodiment of this disclosure is applied to a liquid crystal display device. Referring to FIG. 15, the liquid crystal display device includes a thin film transistor array TFTA, a color filter array CFA and a liquid crystal layer (not shown) between the thin film transistor array TFTA and the color filter array CFA. The color filter array CFA includes an upper polarization plate POL1 formed on an upper surface thereof, and the thin film transistor array TFTA includes a lower polarization plate POL2 formed on a lower surface thereof. In case the proximity/motion and touch sensor according to the fifth exemplary embodiment of this disclosure is applied to the liquid crystal display device, the proximity/motion driving electrode PT of the proximity/motion and touch sensor according to the fifth exemplary embodiment is disposed between the upper polarization plate POL1 and the color filter array CFA.

FIG. 16 is a cross-sectional view schematically showing an example in which the proximity/motion and touch sensor according to the sixth exemplary embodiment of this disclosure is applied to a liquid crystal display device. Referring to FIG. 16, the liquid crystal display device has the same construction the liquid crystal display device shown in FIG. 7. The proximity/motion driving electrode PT of the proximity/motion and touch sensor according to the sixth exemplary embodiment of this disclosure is disposed between the upper polarization plate POL1 and the color filter array CFA.

Figure 17:
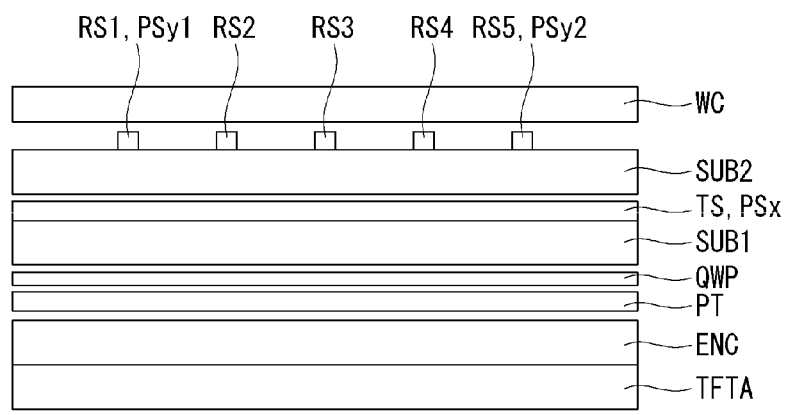
FIG. 17 is a cross-sectional view schematically showing an example in which the proximity/motion and touch sensor according to the fifth exemplary embodiment of this disclosure is applied to an organic light emitting diode display device.

FIG. 17 is a cross-sectional view schematically showing an example in which the proximity/motion and touch sensor according to the fifth exemplary embodiment of this disclosure is applied to an organic light emitting display device. Referring to FIG. 17, the organic light emitting display device includes a thin film transistor array TFTA having organic light emitting elements, and an encapsulator ENC for protecting the thin film transistor array TFTA. The encapsulator ENC includes a quarter-wave polarization plate QWP formed on an upper surface thereof to prevent external light from being reflected. In case the proximity/motion and touch sensor according to the fifth exemplary embodiment of this disclosure is applied to the organic light emitting display device, the proximity/motion driving electrode PT of the proximity/motion and touch sensor according to the fifth exemplary embodiment of this disclosure is disposed between the quarter-wave polarization plate QWP and the encapsulator ENC.

Figure 18:
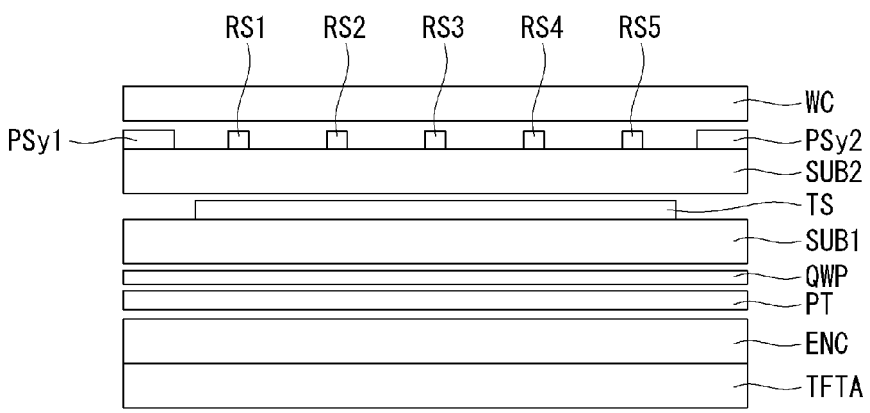
FIG. 18 is a cross-sectional view schematically showing an example in which the proximity/motion and touch sensor according to the sixth exemplary embodiment of this disclosure is applied to an organic light emitting diode display device.

FIG. 18 is a cross-sectional view schematically showing an example in which the proximity/motion and touch sensor according to the sixth exemplary embodiment of this disclosure is applied to an organic light emitting display device. Referring to FIG. 18, the organic light emitting display device has the same construction as the organic light emitting display device shown in FIG. 9. The proximity/motion driving electrode PT of the proximity/motion and touch sensor according to the sixth exemplary embodiment of this disclosure is disposed between the quarter-wave polarization plate QWP and the encapsulator ENC.

FIG. 19 is a cross-sectional view schematically showing an example in which the proximity/motion and touch sensor according to the seventh exemplary embodiment of this disclosure is applied to a liquid crystal display device. Referring to FIG. 19, the liquid crystal display device includes a thin film transistor array TFTA, a color filter array CFA and a liquid crystal layer (not shown) between the thin film transistor array TFTA and the color filter array CFA. The color filter array CFA includes an upper polarization plate POL1 formed on an upper surface thereof, and the thin film transistor array TFTA includes a lower polarization plate POL2 formed on a lower surface thereof. In case the proximity/motion and touch sensor according to the seventh exemplary embodiment of this disclosure is applied to the liquid crystal display device, the proximity/motion driving electrode PT of the proximity/motion and touch sensor according to the seventh exemplary embodiment is disposed between the upper polarization plate POL1 and the color filter array CFA.

FIG. 20 is a cross-sectional view schematically showing an example in which the proximity/motion and touch sensor according to the eighth exemplary embodiment of this disclosure is applied to a liquid crystal display device. Referring to FIG. 20, the liquid crystal display device has the same construction the liquid crystal display device shown in FIG. 7. The proximity/motion driving electrode PT of the proximity/motion and touch sensor according to the eighth exemplary embodiment of this disclosure is disposed between the upper polarization plate POL1 and the color filter array CFA.

Figure 21:
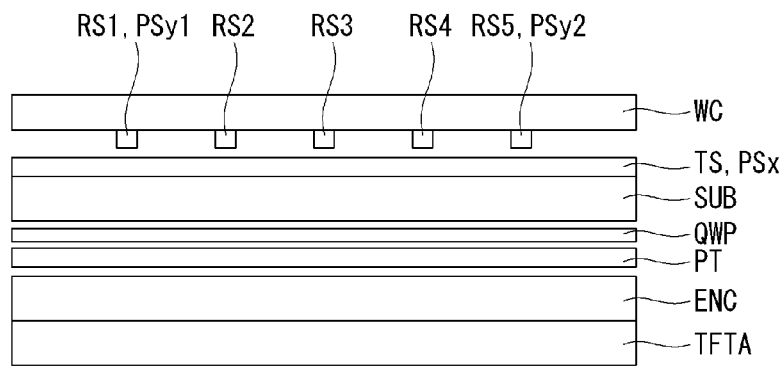
FIG. 21 is a cross-sectional view schematically showing an example in which the proximity/motion and touch sensor according to the seventh exemplary embodiment of this disclosure is applied to an organic light emitting diode display device.

FIG. 21 is a cross-sectional view schematically showing an example in which the proximity/motion and touch sensor according to the seventh exemplary embodiment of this disclosure is applied to an organic light emitting display device. Referring to FIG. 21, the organic light emitting display device includes a thin film transistor array TFTA having organic light emitting elements, and an encapsulator ENC for protecting the thin film transistor array TFTA. The encapsulator ENC includes a quarter-wave polarization plate QWP formed on an upper surface thereof to prevent external light from being reflected. In case the proximity/motion and touch sensor according to the seventh exemplary embodiment of this disclosure is applied to the organic light emitting display device, the proximity/motion driving electrode PT of the proximity/motion and touch sensor according to the seventh exemplary embodiment of this disclosure is disposed between the quarter-wave polarization plate QWP and the encapsulator ENC.

Figure 22:
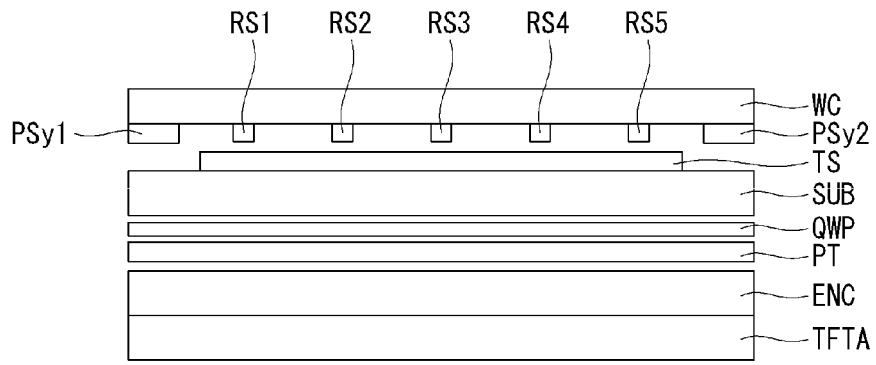
FIG. 22 is a cross-sectional view schematically showing an example in which the proximity/motion and touch sensor according to the eighth exemplary embodiment of this disclosure is applied to an organic light emitting diode display device.

FIG. 22 is a cross-sectional view schematically showing an example in which the proximity/motion and touch sensor according to the eighth exemplary embodiment of this disclosure is applied to an organic light emitting display device. Referring to FIG. 22, the organic light emitting display device has the same construction as the organic light emitting display device shown in FIG. 9. The proximity/motion driving electrode PT of the proximity/motion and touch sensor according to the eighth exemplary embodiment of this disclosure is disposed between the quarter-wave polarization plate QWP and the encapsulator ENC.

Figure 23:
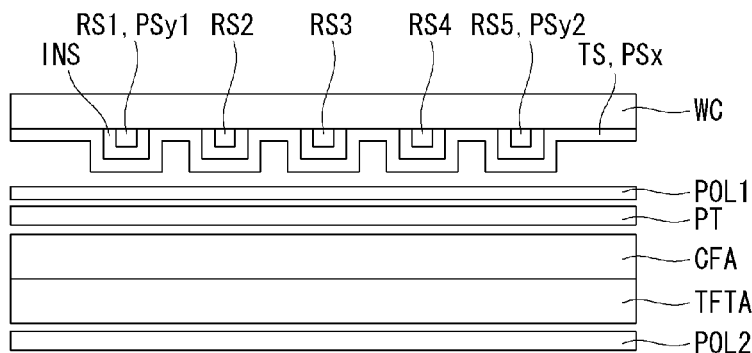
FIG. 23 is a cross-sectional view schematically showing an example in which the proximity/motion and touch sensor according to a ninth exemplary embodiment of this disclosure is applied to a liquid crystal display device.

FIG. 23 is a cross-sectional view schematically showing an example in which the proximity/motion and touch sensor according to the ninth exemplary embodiment of this disclosure is applied to a liquid crystal display device. Referring to FIG. 23, the liquid crystal display device includes a thin film transistor array TFTA, a color filter array CFA and a liquid crystal layer between the thin film transistor array TFTA and the color filter array CFA. The color filter array CFA includes an upper polarization plate POL1 formed on an upper surface thereof, and the thin film transistor array TFTA includes a lower polarization plate POL2 formed on a lower surface thereof. In case the proximity/motion and touch sensor according to the ninth exemplary embodiment of this disclosure is applied to the liquid crystal display device, the proximity/motion driving electrode PT of the proximity/motion and touch sensor according to the ninth exemplary embodiment is disposed between the upper polarization plate POL1 and the color filter array CFA.

Figure 24:
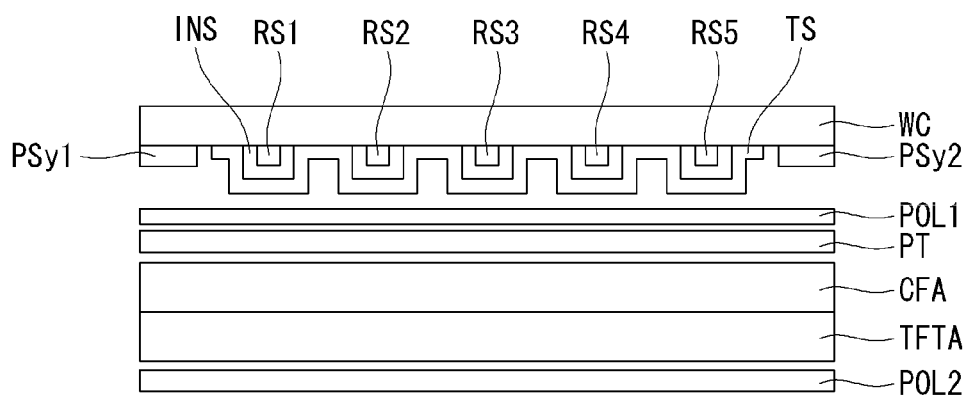
FIG. 24 is a cross-sectional view schematically showing an example in which the proximity/motion and touch sensor according to a tenth exemplary embodiment of this disclosure is applied to a liquid crystal display device.

FIG. 24 is a cross-sectional view schematically showing an example in which the proximity/motion and touch sensor according to the tenth exemplary embodiment of this disclosure is applied to a liquid crystal display device. Referring to FIG. 24, the liquid crystal display device has the same construction the liquid crystal display device shown in FIG. 7. The proximity/motion driving electrode PT of the proximity/motion and touch sensor according to the tenth exemplary embodiment of this disclosure is disposed between the upper polarization plate POL1 and the color filter array CFA.

Figure 25:
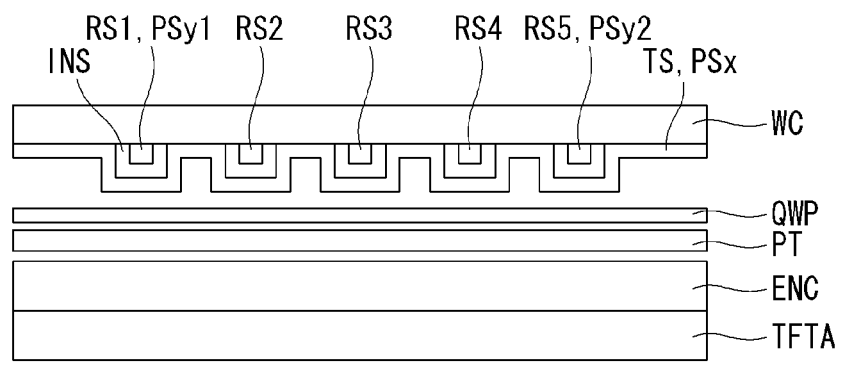
FIG. 25 is a cross-sectional view schematically showing an example in which the proximity/motion and touch sensor according to the ninth exemplary embodiment of this disclosure is applied to an organic light emitting diode display device.

FIG. 25 is a cross-sectional view schematically showing an example in which the proximity/motion and touch sensor according to the ninth exemplary embodiment of this disclosure is applied to an organic light emitting display device. Referring to FIG. 25, the organic light emitting display device includes a thin film transistor array TFTA having organic light emitting elements, and an encapsulator ENC for protecting the thin film transistor array TFTA. The encapsulator ENC includes a quarter-wave polarization plate QWP formed on an upper surface thereof to prevent external light from being reflected. In case the proximity/motion and touch sensor according to the ninth exemplary embodiment of this disclosure is applied to the organic light emitting display device, the proximity/motion driving electrode PT of the proximity/motion and touch sensor according to the ninth exemplary embodiment of this disclosure is disposed between the quarter-wave polarization plate QWP and the encapsulator ENC.

Figure 26:
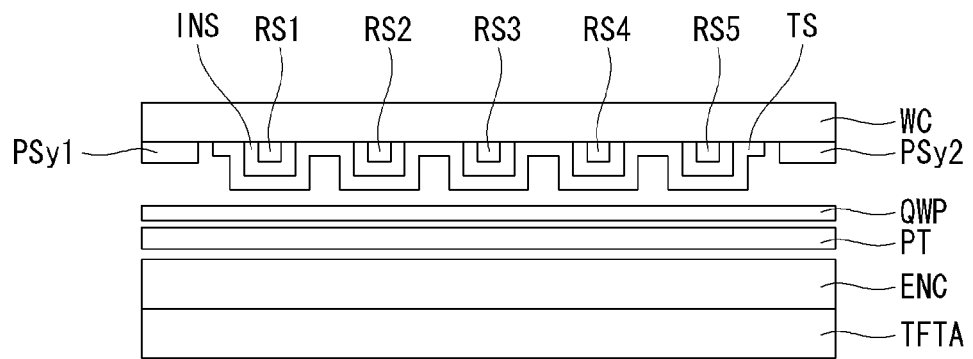
FIG. 26 is a cross-sectional view schematically showing an example in which the proximity/motion and touch sensor according to the tenth exemplary embodiment of this disclosure is applied to an organic light emitting diode display device.

FIG. 26 is a cross-sectional view schematically showing an example in which the proximity/motion and touch sensor according to the tenth exemplary embodiment of this disclosure is applied to an organic light emitting display device. Referring to FIG. 26, the organic light emitting display device has the same construction as the organic light emitting display device shown in FIG. 9. The proximity/motion driving electrode PT of the proximity/motion and touch sensor according to the tenth exemplary embodiment of this disclosure is disposed between the quarter-wave polarization plate QWP and the encapsulator ENC.

In the description mentioned above, examples in which the proximity/motion and touch sensors according to the first to tenth exemplary embodiments are applied to the liquid crystal display devices and the organic light emitting display devices are described, but this disclosure is not limited thereto. For example, proximity/motion and touch sensors according to the exemplary embodiments may be applied to any display devices such as field emission displays (FED), plasma display Panels, and an electrophoretic display (EPD).

Although embodiments have been described with reference to a number of illustrative examples thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A proximity/motion and touch sensor, comprising:
a proximity/motion driving electrode;
a plurality of first proximity/motion sensing electrode serials insulated from the proximity/motion driving electrode and arranged in a first direction to be separated from each other;
a plurality of second proximity/motion sensing electrode serials insulated from the proximity/motion driving electrode and arranged in a second direction to be separated from each other, the first direction being substantially perpendicular to the second direction, proximity/motion being determined by a proximity/motion driving voltage supplied to the proximity/motion driving electrode and differences in mutual capacitance between the proximity/motion driving electrode and the plurality of first proximity/motion sensing electrode serials and the plurality of second proximity/motion sensing electrodes serials caused by proximity/motion occurring in vicinity of the proximity/motion and touch sensor without directly touching the proximity/motion and touch sensor;
a plurality of first touch electrode serials insulated from the proximity/motion driving electrode and arranged in the first direction to be separated from each other;
a plurality of second touch electrode serials insulated from the first proximity/motion sensing electrode serials and the first touch electrode serials and arranged in the second direction to be separated from each other, touch being determined by a touch driving voltage supplied to the plurality of first touch electrode serials and differences in mutual capacitance between the plurality of first touch electrode serials and the plurality of second touch electrode serials caused by a direct touch of an input device on the proximity/motion and touch sensor; and
a polarization plate insulating the plurality of first proximity/motion sensing electrode serials, the plurality of second proximity/motion sensing electrode serials, the plurality of first touch electrode serials, and the plurality of second touch electrode serials from the proximity/motion driving electrode.

2. The proximity/motion and touch sensor of claim 1,
wherein the plurality of first proximity/motion sensing electrode serials are uppermost and lowermost first touch electrode serials among the plurality of first touch electrode serials, and
the plurality of second proximity/motion sensing electrode serials are leftmost and rightmost second touch electrode serials among the plurality of second touch electrode serials.

3. The proximity/motion and touch sensor of claim 1,
wherein the plurality of first proximity/motion sensing electrode serials are disposed at outside uppermost and lowermost first touch electrode serials among the plurality of first touch electrode serials, and
the plurality of second proximity/motion sensing electrode serials are disposed at outside leftmost and rightmost second touch electrode serials among the plurality of second touch electrode serials.

4. The proximity/motion and touch sensor of claim 2, further comprising:
a proximity/motion controller that supplies the proximity/motion driving voltage to the proximity/motion driving electrode and is coupled to the uppermost and lowermost first touch electrode serials and the leftmost and rightmost second touch electrode serials; and
a touch controller that supplies the touch driving voltage to the first touch electrode serials and is coupled to the plurality of the second touch electrode serials.

5. The proximity/motion and touch sensor of claim 3, further comprising:
a proximity/motion controller that supplies the proximity/motion driving voltage to the proximity/motion driving electrode and is coupled to the first and second proximity/motion sensing electrode serials; and
a touch controller that supplies the touch driving voltage to the first touch electrode serials and is coupled to the plurality of the second touch electrode serials.

6. The proximity/motion and touch sensor of claim 2,
wherein the proximity/motion driving electrode is formed below a substrate, and
the first and second touch electrode serials are formed above the substrate and insulated from each other by an insulation layer.

7. A proximity/motion and touch sensor comprising:
a proximity/motion driving electrode formed below a substrate;
a plurality of first proximity/motion sensing electrode serials insulated from the proximity/motion driving electrode and arranged in a first direction to be separated from each other;
a plurality of second proximity/motion sensing electrode serials insulated from the proximity/motion driving electrode and arranged in a second direction to be separated from each other, the first direction being substantially perpendicular to the second direction;
a plurality of first touch electrode serials insulated from the proximity/motion driving electrode and arranged in the first direction to be separated from each other, the plurality of first proximity/motion sensing electrode serials being uppermost and lowermost first touch electrode serials among the plurality of first touch electrode serials;
a plurality of second touch electrode serials insulated from the first proximity/motion sensing electrode serials and the first touch electrode serials and arranged in the second direction to be separated from each other, the first and second touch electrode serials formed above the substrate and insulated from each other by an insulation layer, the plurality of second proximity/motion sensing electrode serials being leftmost and rightmost second touch electrode serials among the plurality of second touch electrode serials; and a polarization plate insulating the plurality of first proximity/motion sensing electrode serials, the plurality of second proximity/motion sensing electrode serials, the plurality of first touch electrode serials, and the plurality of second touch electrode serials from the proximity/motion driving electrode, the polarization plate positioned between the substrate and the proximity/motion driving electrode.

8. The proximity/motion and touch sensor of claim 3, wherein the proximity/motion driving electrode is formed on a first surface of a substrate, the first and second proximity/motion sensing electrode serials are formed on a second surface of the substrate to be separated from each other, the first touch electrode serials are insulated from the second touch electrode serials by an insulation layer, and the first and second touch electrode serials are formed on the second surface of the substrate to be separated from the first and second proximity/motion sensing electrode serials.

9. The proximity/motion and touch sensor of claim 8, wherein the polarization plate is formed between the substrate and the proximity/motion driving electrode.

10. The proximity/motion and touch sensor of claim 2, wherein the first touch electrode serials are formed on a first surface of a substrate, the proximity/motion driving electrode are formed on an insulation or the polarization plate covering the first touch electrode serials, and the second touch electrode serials are formed on a second surface of the substrate.

11. The proximity/motion and touch sensor of claim 3, wherein the first touch electrode serials and the first proximity/motion sensing electrode serials are formed on a first surface of a substrate to be separated from each other, the proximity/motion driving electrode is formed on an insulation layer or the polarization plate covering the first touch electrode serials, and the second touch electrode serials and the second proximity/motion sensing electrode serials are formed on a second surface of the substrate to be separated from each other.

12. The proximity/motion and touch sensor of claim 2, wherein the proximity/motion driving electrode is formed on a first surface of a first substrate, the first touch electrode serials are formed on a second surface of the first substrate, and the second touch electrode serials are formed on an opposite surface of a second substrate opposite to the first touch electrode serials formed on the first substrate.

13. The proximity/motion and touch sensor of claim 3, wherein the proximity/motion driving electrode is formed on a first surface of a first substrate, the first touch electrode serials and the first proximity/motion sensing electrode serials are formed on the first surface of the first substrate to be separated from each other, and the second touch electrode serials and the second proximity/motion sensing electrode serials are formed on an opposite surface of a second substrate opposite to the first touch electrode serials formed on the first substrate.

14. The proximity/motion and touch sensor of claim 12, wherein the polarization plate is formed between the first substrate and the proximity/motion driving electrode.

15. The proximity/motion and touch sensor of claim 2, wherein the proximity/motion driving electrode is formed on a first surface of a substrate, the first touch electrode serials are formed on a second surface of the substrate, and the second touch electrode serials are formed on a surface of a window cover opposite to the first touch electrode serials formed on the substrate.

16. The proximity/motion and touch sensor of claim 3, wherein the proximity/motion driving electrode is formed on a first surface of a substrate, the first touch electrode serials and the first proximity/motion sensing electrode serials are formed on a second surface of the substrate to be separated from each other, and the second touch electrode serials and the second proximity/motion sensing electrode serials are formed on a surface of the window cover opposite to the first touch electrode serials formed on the substrate.

17. The proximity/motion and touch sensor of claim 15, wherein the polarization plate is formed between the substrate and the proximity/motion driving electrode.

18. The proximity/motion and touch sensor of claim 2, wherein the first touch electrode serials are formed on a window cover, the second touch electrode serials are formed on an insulation layer covering the first touch electrode serials, and the proximity/motion driving electrode is formed on the touch electrode serials with an insulation layer or the polarization plate therebetween.

19. The proximity/motion and touch sensor of claim 3, wherein the first touch electrode serials and the first proximity/motion sensing electrode serials are formed on a window cover to be separated from each other, the second touch electrode serials are formed on an insulation layer covering the first touch electrode serials, and the proximity/motion driving electrode is formed on the second touch electrode serials with an insulation layer or the polarization plate therebetween.

20. The proximity/motion and touch sensor of claim 1, wherein the polarization plate is between the proximity/motion driving electrode and the plurality of first proximity/motion sensing electrode serials, the plurality of second proximity/motion sensing electrode serials, the plurality of first touch electrode serials, and the plurality of second touch electrode serials.

21. A proximity/motion and touch sensor comprising:

a proximity/motion driving electrode;

a plurality of first proximity/motion sensing electrode serials insulated from the proximity/motion driving electrode and arranged in a first direction to be separated from each other;

a plurality of second proximity/motion sensing electrode serials insulated from the proximity/motion driving electrode and arranged in a second direction to be separated from each other, the first direction being substantially perpendicular to the second direction;

a plurality of first touch electrode serials insulated from the proximity/motion driving electrode and arranged in the first direction to be separated from each other;

a plurality of second touch electrode serials insulated from the first proximity/motion sensing electrode serials and the first touch electrode serials and arranged in the second direction to be separated from each other; and a polarization plate insulating the plurality of first proximity/motion sensing electrode serials, the plurality of second proximity/motion sensing electrode serials, the plurality of first touch electrode serials, and the plurality of second touch electrode serials from the proximity/motion driving electrode, the polarization plate being positioned between a substrate and the proximity/motion driving electrode.

* * * * *